(12) United States Patent
Kishore et al.

(10) Patent No.: US 7,693,129 B1
(45) Date of Patent: *Apr. 6, 2010

(54) METHOD AND SYSTEM FOR FRAME AND FREQUENCY SYNCHRONIZATION IN PACKET-BASED ORTHOGONAL FREQUENCY DIVISION MULTIPLEXING

(75) Inventors: Ch. Nanda Kishore, Hyderabad (IN); V. Umapathi Reddy, Hyderabad (IN)

(73) Assignee: Hellosoft India PVT. Ltd, Hyderabad (IN)

( * ) Notice: Subject to any disclaimer, the term of this patent is extended or adjusted under 35 U.S.C. 154(b) by 1130 days.

This patent is subject to a terminal disclaimer.

(21) Appl. No.: 11/291,316

(22) Filed: Dec. 1, 2005

(51) Int. Cl.
*H04J 3/06* (2006.01)
*H04W 4/00* (2009.01)

(52) U.S. Cl. ................ 370/350; 370/210; 370/330; 370/478; 370/509

(58) Field of Classification Search ........... 370/210, 370/310, 312, 328–330, 350, 432, 436, 478, 370/509–514; 375/137, 140, 143, 152, 327, 375/344, 362, 365, 368, 373, 376; 455/75, 455/525
See application file for complete search history.

(56) References Cited

U.S. PATENT DOCUMENTS

| 5,914,931 | A * | 6/1999 | Kang et al. ............ 370/203 |
| 7,286,617 | B2 * | 10/2007 | Vanderperren et al. ...... 375/343 |
| 7,313,085 | B2 * | 12/2007 | Kim ..................... 370/208 |
| 2003/0072256 | A1 * | 4/2003 | Kim ..................... 370/208 |
| 2003/0112743 | A1 * | 6/2003 | You et al. .............. 370/203 |
| 2003/0174790 | A1 * | 9/2003 | Ho et al. ............... 375/340 |
| 2005/0169408 | A1 * | 8/2005 | Kim ..................... 375/343 |

FOREIGN PATENT DOCUMENTS

WO    WO 0225881 A1 * 3/2002

OTHER PUBLICATIONS

Schmidl, Timothy et al., "Robust Frequency and Timing Synchronization for OFDM," IEEE Transactions on Communications, Dec. 1997, vol. 45, pp. 1613-1621.*

* cited by examiner

*Primary Examiner*—Donald L Mills
(74) *Attorney, Agent, or Firm*—William L. Botjer

(57) ABSTRACT

A method, system, and computer program product for frame and frequency synchronization in packet-based Orthogonal Frequency Division Multiplexing (OFDM) in wireless digital communication systems. An OFDM packet includes a preamble preceded by a Cyclic Prefix (CP). The method includes computing a timing metric for packet-based OFDM. The timing metric yields a sharp peak at a preamble boundary. The preamble boundary is detected, based on a threshold. The threshold is determined a priori, based on mean and variance of the timing metric at the preamble boundary and in its neighborhood. The mean and the variance are evaluated for an Additive White Gaussian Noise (AWGN) channel. The detection of the preamble boundary enables frame synchronization in packet-based OFDM. The method further involves the task of frequency-offset estimation, using the preamble. The frequency-offset estimation enables frequency synchronization in packet-based OFDM.

4 Claims, 8 Drawing Sheets

METHOD AND SYSTEM FOR FRAME AND FREQUENCY SYNCHRONIZATION IN PACKET-BASED ORTHOGONAL FREQUENCY DIVISION MULTIPLEXING

BACKGROUND OF THE INVENTION

The present invention relates to packet-based Orthogonal Frequency Division Multiplexing (OFDM) in wireless digital communication systems. More specifically, the present invention relates to a system and a method for frame and frequency synchronization in packet-based OFDM.

Advancements in communication technology have resulted in parallel transmission schemes for transmitting data at very high rates over time-dispersive radio channels. One such scheme for parallel transmission is packet-based OFDM, which is a transmission technique based on the concept of Frequency Division Multiplexing (FDM). In FDM, multiple signals are transmitted simultaneously over a single transmission path, but on different frequency bands. Extending this concept further, the different carriers used for transmitting multiple signals over different frequency bands are orthogonal to each other in OFDM. As a result, an OFDM bandpass signal is the sum of a number of orthogonal sub-carriers, with the data on each sub-carrier being modulated independently. The sub-carriers can be modulated by using various modulation techniques, for example, Quadrature Amplitude Modulation (QAM) and Phase Shift Keying (PSK). The OFDM provides high spectrum efficiency, resistance against multipath interference, and facilitates a simple channel equalizer.

A significant challenge associated with packet-based OFDM is frame synchronization and frequency-offset estimation. Frame synchronization in OFDM refers to frame alignment of the received stream of data. This is achieved by exploiting distinctive bit sequences. Subsequently, data bits within the frame can be extracted for decoding and retransmission. Further, frequency-offset represents a frequency difference between the carrier signals generated by oscillators of a transceiver. Frequency-offset estimation refers to the precise estimation of the frequency difference. Frequency-offset estimation enables frequency synchronization in packet-based OFDM.

Several methods have been conventionally used for frame synchronization and frequency-offset estimation in packet-based OFDM. Schimdl and Cox (Robust frequency and timing synchronization for OFDM, IEEE Trans. Commun., vol. COM-45, pp. 1613-1621, 1997) proposed one such method for frame and frequency synchronization in packet-based OFDM that uses a preamble of certain structure. According to this method, a timing metric is used, which exploits the symmetry in the first symbol of the preamble. The first symbol consists of two identical halves in the time domain. The frequency-offset within a ±1 subcarrier spacing is estimated from the phase of the numerator term of the timing metric at the boundary of the first symbol of the preamble. Moreover, frequency-offset above ±1 subcarrier spacing is estimated using the second symbol of the preamble. However, the proposed timing metric suffers from a plateau, which causes ambiguity in determining the start of the frame. As a result, frame synchronization may not be accurate.

In light of the foregoing discussion, a need exists for a method and system for frame synchronization and frequency-offset estimation, in an accurate and unambiguous manner, for packet-based OFDM. The present invention addresses such a need.

SUMMARY OF THE INVENTION

An object of the present invention is to provide a method and system for frame and frequency synchronization in packet-based Orthogonal Frequency Division Multiplexing (OFDM) in wireless digital communication systems.

Another object of the present invention is to estimate the Cyclic Prefix (CP) length in packet-based OFDM.

Yet another object of the present invention is to provide frame and frequency synchronization in packet-based OFDM, for uplinks and downlinks with a preamble consisting of two identical halves in the time domain.

Various embodiments of the present invention relate to a method, system and computer program product for frame and frequency synchronization in packet-based OFDM. An OFDM packet includes a preamble preceded by the CP. In addition, the OFDM packet includes one or more data symbols. The preamble is present at the beginning of the OFDM packet. The method includes computing a timing metric for packet-based OFDM. The timing metric yields a sharp peak at a preamble boundary. Subsequently, the preamble boundary is detected, based on a threshold. The threshold is determined a priori, based on mean and variance of the timing metric at the preamble boundary and in its neighborhood. The mean and the variance are evaluated for an Additive White Gaussian Noise (AWGN) channel. The detection of the preamble boundary enables frame synchronization in packet-based OFDM. The method also involves the task of frequency-offset estimation, using the preamble. The frequency-offset estimation enables frequency synchronization in packet-based OFDM.

BRIEF DESCRIPTION OF THE DRAWINGS

Various embodiments of the present invention will herein after be described in conjunction with the appended drawings, provided to illustrate and not to limit the present invention, wherein like designations denote like elements, and in which.

DESCRIPTION OF VARIOUS EMBODIMENTS

Various embodiments of the present invention relate to a method, system, and computer program product for frame and frequency synchronization in packet-based Orthogonal Frequency Division Multiplexing (OFDM). An OFDM packet includes a preamble preceded by a Cyclic Prefix (CP). In addition, the OFDM packet includes one or more data symbols. The preamble is present at the beginning of the OFDM packet. The method includes computing a timing metric for packet-based OFDM. The timing metric yields a sharp peak at a preamble boundary. Subsequently, the preamble boundary is detected, based on a threshold. The threshold is determined a priori, based on mean and variance of the timing metric at the preamble boundary and in the neighborhood of the preamble boundary. The mean and the variance are evaluated for an Additive White Gaussian Noise (AWGN) channel. The detection of the preamble boundary enables frame synchronization in packet-based OFDM. The method further involves the task of frequency-offset estimation, using the preamble. The frequency-offset estimation enables frequency synchronization in packet-based OFDM.

Figure 1:
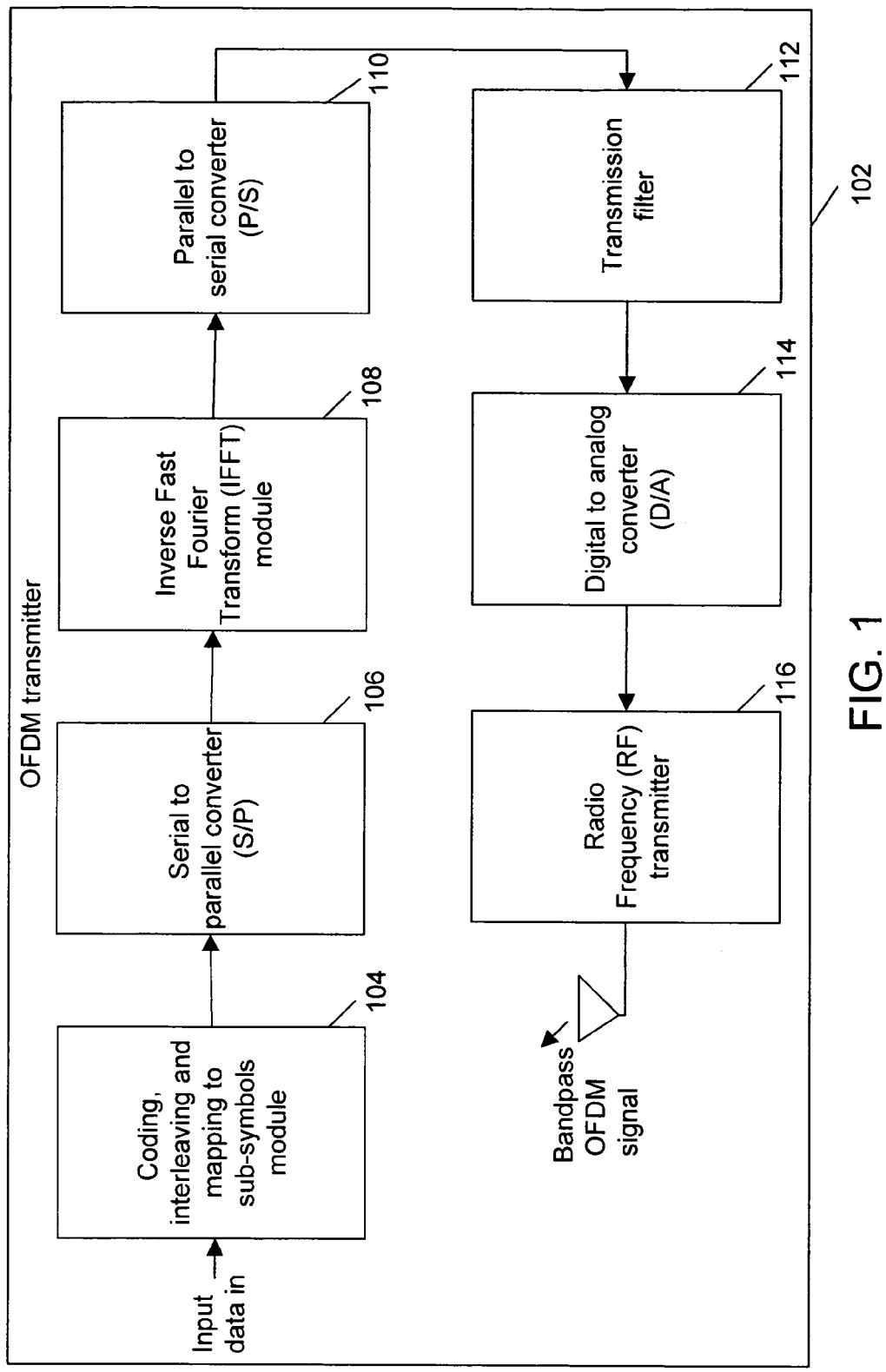
FIG. 1 is a block diagram of an Orthogonal Frequency Division Multiplexing (OFDM) transmitter, wherein various embodiments of the present invention can be practiced.

FIG. 1 is a block diagram of an OFDM transmitter 102, wherein various embodiments of the present invention can be practiced. OFDM transmitter 102 includes a coding, interleaving, and mapping to sub-symbols module 104, herein after referred to as CIM module 104, a serial-to-parallel converter (S/P) 106, an Inverse Fast Fourier Transform (IFFT) module 108, a parallel-to-serial converter (P/S) 110, a transmission filter 112, a digital-to-analog converter (D/A) 114, and a Radio Frequency (RF) transmitter 116.

A block of input data is sent to CIM module 104, which performs coding, interleaving and mapping to sub-symbols. The input data is in the form of bits. The block of input data is encoded and interleaved by coding, interleaving and mapping to sub-symbols module 104. Subsequently, the interleaved bits are mapped to Phase Shift Keying (PSK) or Quadrature Amplitude Modulation (QAM) sub-symbols by CIM module 104. Each of the sub-symbols modulates a different carrier. Further, known pilot symbols modulate pilot sub-carriers. The sub-symbols for guard carriers are zero amplitude symbols. The coded, interleaved and mapped block of data is in the serial form and is sent to S/P 106, which converts the serial data into a parallel block of data. The parallel block of data is then sent to IFFT module 108. IFFT module 108 generates a base-band signal by taking the inverse fast Fourier transform of the PSK or QAM sub-symbols. Further, IFFT module 108 outputs the preamble with two identical halves which is placed at the beginning of each frame of data. Samples of the base-band equivalent of the OFDM signal can be expressed as $$x(n) = \frac{1}{\sqrt{N}} \sum_{k=0}^{N-1} X(k)e^{j2\pi k(n-L)/N}, \quad 0 \leq n \leq N+L-1 \quad (1)$$

where N is the total number of carriers, L is the length of the CP, $X(k)$ is the $k^{th}$ sub-symbol, and $j=\sqrt{-1}$.

The base-band signal is then transmitted to P/S 110, which converts the incoming parallel block of data into a serial data. The serial data is then passed through transmission filter 112. Transmission filter 112 shapes the spectrum of the signal to be transmitted as specified by the transmission standard and sends to D/A 114, which converts the incoming digital signals from transmission filter 112 to analog signals. Subsequently, R/F transmitter 116 transmits the analog signals generated by D/A 114 as a bandpass OFDM signal through a frequency-selective multipath channel.

Figure 2:
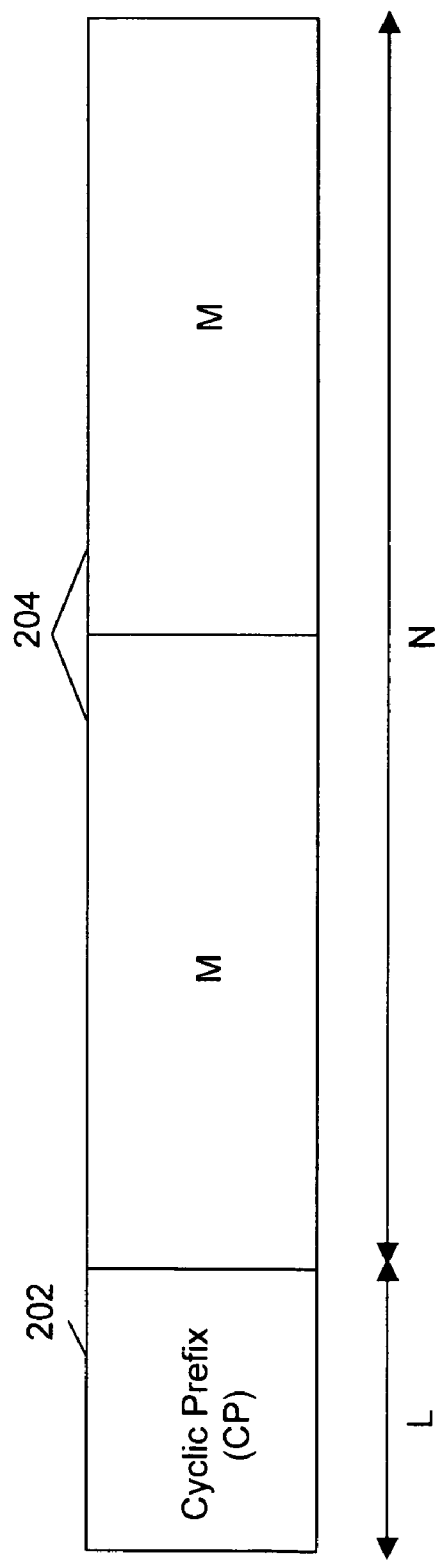
FIG. 2 is an exemplary preamble in an OFDM packet, in accordance with an embodiment of the present invention.

In accordance with an embodiment of the present invention, let $h(n)$ denote a base-band equivalent discrete-time channel impulse response of length 'v'. A carrier frequency-offset of $\epsilon$ (normalized with subcarrier spacing) causes a phase rotation of $2\pi\epsilon n/N$. Assuming a perfect sampling clock, the $n_{th}$ sample of the received OFDM symbol is given by, $$r(n)=e^{j[(2\pi\epsilon n/N)+\theta_0]}\Sigma_{l=0}^{v-1}h(l)x(n-l)+\eta(n) \quad (2)$$

where $\theta_0$ is the initial arbitrary carrier phase and $\eta(n)$ is the zero mean complex white Gaussian noise with variance $\sigma^2_n$:

FIG. 2 is an exemplary preamble 204 considered for frame and frequency synchronization in packet-based OFDM, in accordance with an embodiment of the present invention. A Cyclic Prefix (CP) 202 precedes preamble 204. The length of CP 202 is L and the length of preamble 204 is N, as illustrated in FIG. 2.

Preamble 204 is an OFDM symbol with two identical halves in the time domain. Preamble 204 can be generated by loading the even frequencies of an OFDM symbol with a Pseudo Noise (PN) sequence. The length of each of the identical halves of preamble 204 is M. Further, if the length of CP, L, is at least as large as that of the channel impulse response, the two identical halves of preamble 204 remain identical at the output of a channel, except for a phase difference between them. The phase difference between them is due to carrier frequency-offset.

In accordance with an embodiment of the present invention, CP 202, followed by preamble 204, is placed at the beginning of a data packet. The preamble is used for frame and frequency synchronization in packet-based OFDM. The method for frame and frequency synchronization has been illustrated in conjunction with FIGS. 3 and 4.

Figure 3:
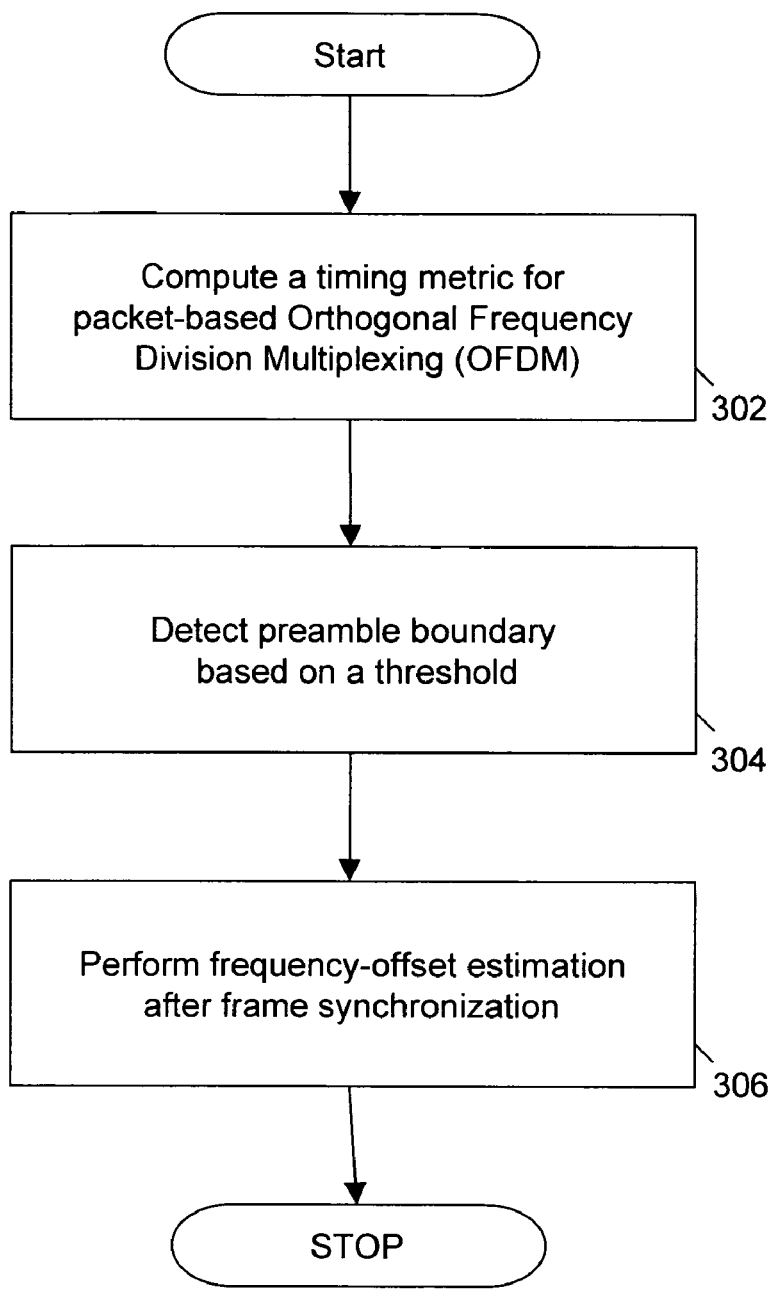
FIG. 3 is a flowchart illustrating the requisite steps for frame and frequency synchronization in packet-based OFDM, in accordance with an embodiment of the present invention.

FIG. 3 is a flowchart illustrating the requisite steps for frame and frequency synchronization in packet-based OFDM, in accordance with an embodiment of the present invention. Frame and frequency synchronization in packet-based OFDM is carried out for an OFDM packet. At step 302, a timing metric is computed for packet-based OFDM. Referring to preamble 204, the timing metric computed at step 302 is:

$$M(d) = \frac{|P(d)|^2}{R^2(d)} \quad (3)$$

where $P(d)$ and $R(d)$ are given by, $$P(d)=\Sigma_{i=0}^{M-1}[r(d+i)a(i)]^*[r(d+i+M)a(i)] \quad (4)$$

$$R(d)=\Sigma_{i=0}^{M-1}|r(d+i+M)|^2 \quad (5)$$

where '*' denotes complex conjugation, $M=N/2$; $r(n)$ is the $n_{th}$ sample of a received signal, as illustrated in equation (2); d is a sample index of the first sample in a window of latest 2M received samples; and $a(n)$, for $n=0, 1, \ldots, M-1$, are the time domain samples of the one of two identical halves of preamble 204.

Further, the numerator of the timing metric, $P(d)$, denotes lag-M auto-correlation of a 2M-length sequence, where M is the number of samples in each of the identical halves of preamble 204. The 2M-length sequence is obtained by multiplying a block of the latest 2M samples of the received signal with 2M samples of preamble 204. The denominator of the timing metric, $R(d)$, denotes an estimate of the energy in the block of M samples of the received signal.

Subsequently, at step 304, a preamble boundary is detected, based on a threshold. The preamble boundary is the sample index corresponding to a sample that comes immediately after CP 202 of preamble 204. The method for detecting the preamble boundary has been explained in detail in conjunction with steps 404-412 of FIGS. 4A and 4B. The threshold is determined a priori, based on the mean and the variance of the timing metric at the preamble boundary and in the neighborhood of the preamble boundary. The mean and the variance have been evaluated for an AWGN channel.

In accordance with an embodiment of the present invention, the threshold varies the different channels. In practice, a threshold and preamble detection strategy is selected that works well for all channels and for SNRs above the lowest operating value. The detection of the preamble boundary enables frame synchronization in packet-based OFDM.

At step 306, frequency-offset estimation is performed after frame synchronization. Frequency-offset estimation is performed using preamble 204. Frequency-offset estimation includes estimating a fractional part and an integer part of the frequency-offset. This has been explained in detail in conjunction with FIGS. 4A and 4B and enables frequency synchronization in packet-based OFDM.

Figure 4A:
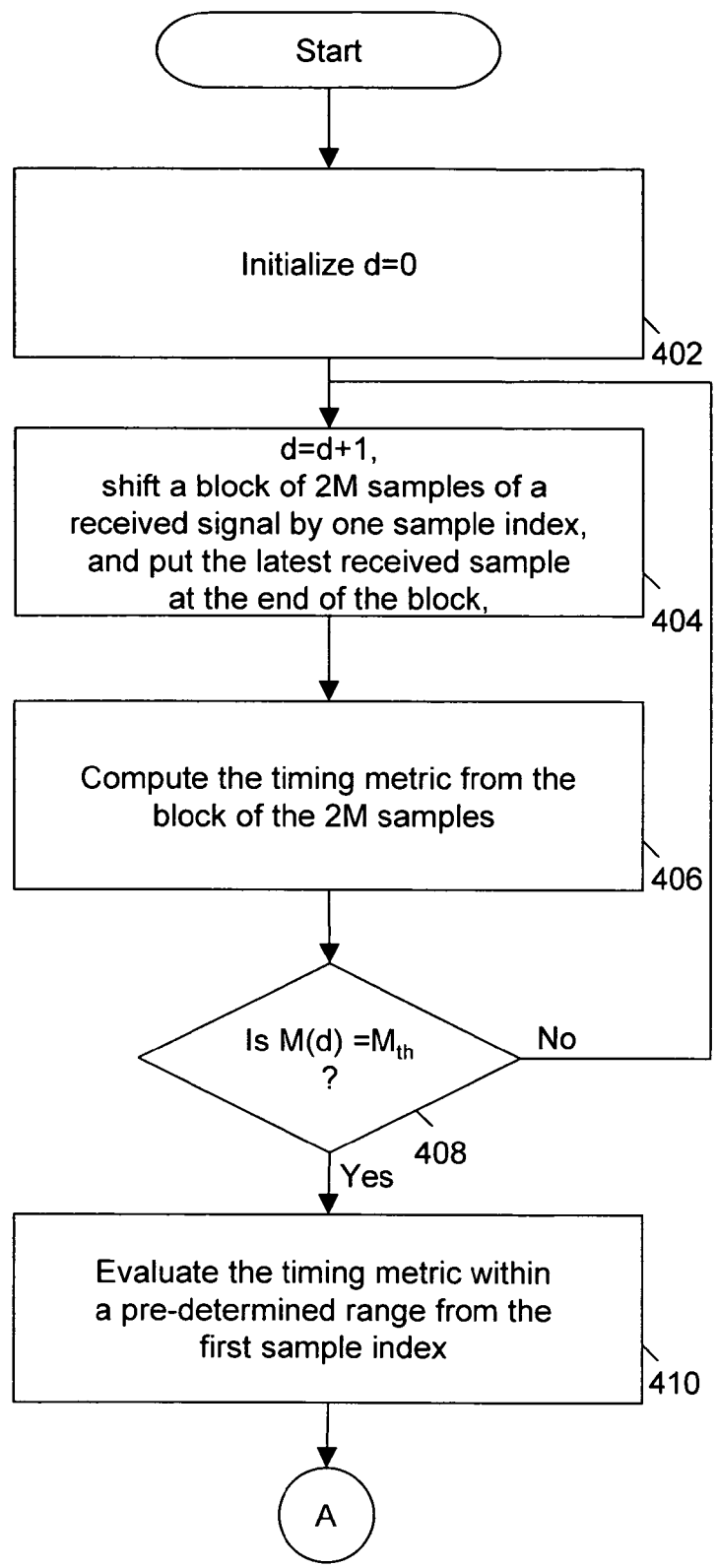
FIGS. 4A and 4B are a flowchart illustrating the detailed steps involved in frame and frequency synchronization of packet-based OFDM, in accordance with an embodiment of the present invention.
Figure 4B:
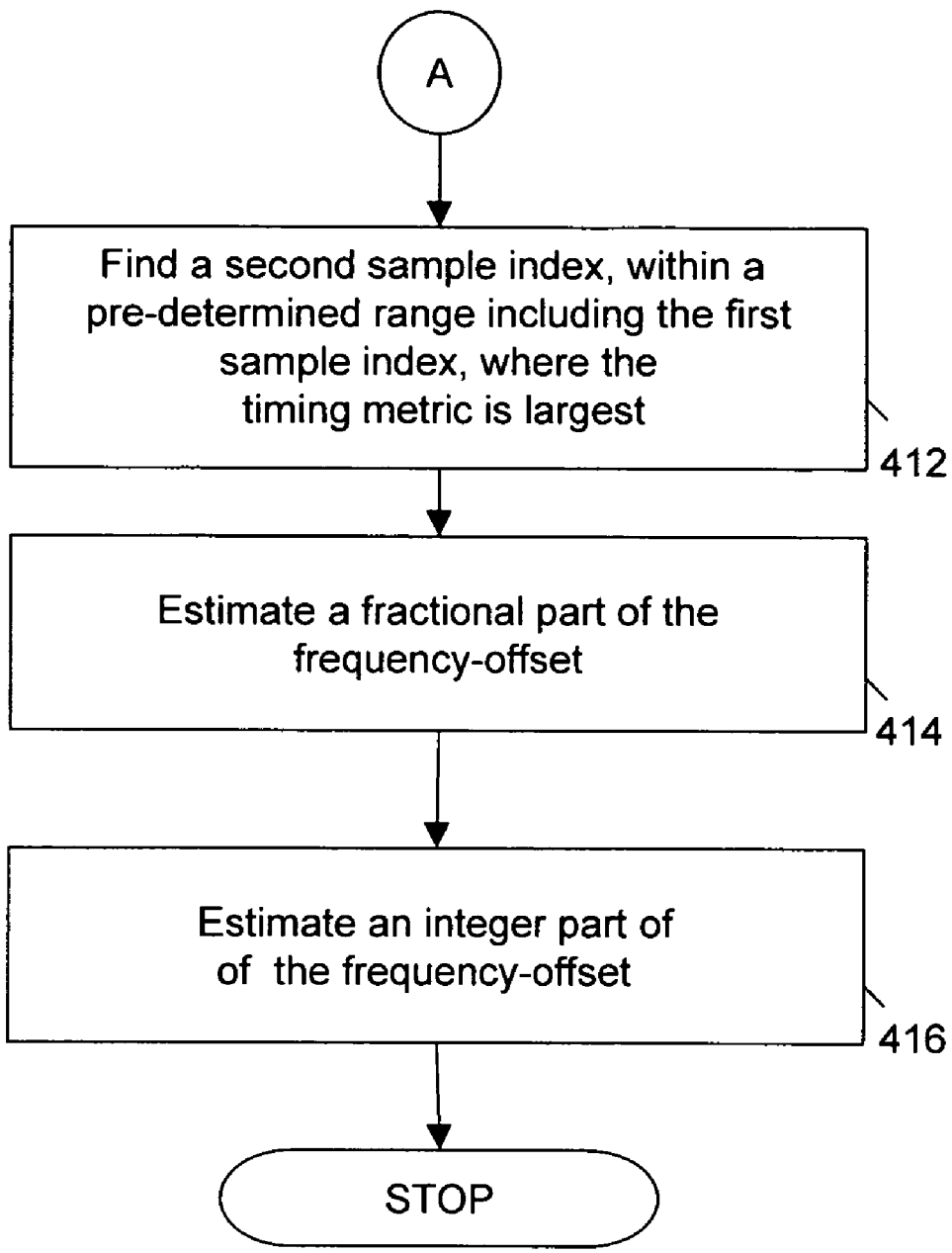

FIGS. 4A and 4B are a flowchart illustrating detailed steps for frame and frequency synchronization in packet-based OFDM, in accordance with an embodiment of the present invention. At step 402, d is initialized to zero. At step 404, d is incremented by one, a block of 2M samples of a received signal is shifted by one sample index, and the latest received sample is put at the end of the block. Subsequently, at step 406, the timing metric is computed from the block of the 2M samples. The timing metric M(d) includes a numerator P(d) and a denominator R(d). The expression for the timing metric M(d) and the values of P(d) and R(d) are the same as expressed in equations (3), (4), and (5).

At step 408, the timing metric, M(d) is compared with the threshold, $M_{th}$. The threshold, $M_{th}$, is determined a priori, based on the mean and variance of the timing metric at the preamble boundary and in the neighborhood of the preamble boundary. The mean and the variance are evaluated for the AWGN channel. If the timing metric M(d) is less than the threshold, $M_{th}$, steps 404-406 are repeated.

In the case where the timing metric, M(d) is greater than or equal to the threshold, $M_{th}$, then the corresponding value of d is marked as a first sample index. At step 410, the timing metric is evaluated within a pre-determined range from the first sample index where the pre-determined range is the length of CP 202, L. For example, considering the first sample index to be the $d_{th}$ sample index, the timing metric is evaluated in the pre-determined range of $d_{th} < d \leq (d_{th}+L-1)$.

At step 412, a second sample index, $d_{opt}$, is found within the pre-determined range including the first sample index. The second sample index corresponds to the sample where the timing metric is largest. The second sample index, $d_{opt}$, is taken as an estimate of the preamble boundary.

The rules for estimating the preamble boundary are summarized below.
i) initialize d=0
ii) d=d+1, and shift the block of 2M samples of the received signal by one sample index and put the latest received sample at the end of the block
iii) compute the timing metric M(d) as stated in Equation (3)
iv) compare M(d) with $M_{th}$. If M(d) is less than $M_{th}$, then repeat steps ii) and iii)
v) If M(d) is greater than or equal to $M_{th}$, then $d_{th}$=d; and evaluate M(d) in the range $d_{th} < d < d_{th}+L$
vi) Find $d_{opt}$=arg max M(d) for $d_{th} \leq d < d_{th}+L$ The detection of the preamble boundary enables frame synchronization for packet-based OFDM. After frame synchronization, frequency synchronization is achieved by performing frequency-offset estimation using preamble 204. Frequency-offset estimation is performed by estimating a fractional part and an integer part of the frequency-offset. At step 414, the fractional part of the frequency-offset is estimated.

In accordance with an embodiment of the present invention, in the presence of frequency-offset, 'ϵ', samples of the received signal include a phase term of the form $[2\pi\epsilon n/N+\theta_0]$.

The phase angle of P(d) at the preamble boundary, in the absence of noise, is given by $\phi=\pi\epsilon$. Therefore, if the frequency-offset is less than a sub-carrier spacing ($|\epsilon|<1$), it can be estimated from $$\hat{\phi}=\text{angle}(P(d_{opt})) \text{ and} \quad (6)$$

$$\hat{\epsilon}=\hat{\phi}/\pi \quad (7)$$

where $d_{opt}$ is the estimate of the sample index corresponding to the preamble boundary and $\hat{\epsilon}$ is the estimate of the frequency-offset. In case, the actual frequency-offset is more than a sub-carrier spacing, say $\bar{\epsilon}=m+\delta$ with $m\in Z$ and $|\delta|<1$, then the frequency-offset estimated will be $$\hat{\epsilon}=m+\delta-\overline{m} \quad (8)$$

where $\overline{m}$ represents an even integer that is closest to $\bar{\epsilon}$. $\hat{\epsilon}$ corresponds to the fractional part, and $\overline{m}$ is the even integer, since the repeated halves of preamble 204 are the result of loading the even sub-carriers with non-zero value and the odd sub-carriers with zero value. After compensating with the fractional part, $\overline{m}$ is estimated from a bin shift estimation. The bin shift estimation refers to the estimation of the integer part of the frequency-offset.

At step 416, the integer part of the frequency-offset is estimated. The integer part of the frequency-offset is estimated by finding a Discrete Fourier Transform (DFT) of an M-length sequence. The M-length sequence is obtained by multiplying the conjugate of M samples of preamble 204 in the transmitted signal with the M samples of a corresponding block in the received signal. The corresponding block in the received signal is obtained after compensating with the fractional part of the frequency-offset, as estimated in step 414. Subsequently, a DFT coefficient with the largest magnitude is found. The DFT coefficient with the largest magnitude enables the estimation of the integer part of the frequency-offset.

In accordance with an embodiment of the present invention, if the frequency error between OFDM transmitter 102 and receiver oscillators is an integer multiple of the sub-carrier spacing, the shift of sub-carriers (in the frequency domain) of the received signal is by the same integer number of sub-carriers.

In accordance with an embodiment of the present invention, the integer part of the frequency-offset can be estimated by finding cross-correlation $R_{AC}(I)$ between M samples of preamble 204 in the transmitted signal and the M samples of the corresponding block in the received signal for different lags. The lag corresponding to the largest value of $|R_{AC}(I)|$ shows the integer part of the frequency-offset.

The rules for estimating the integer part of the frequency-offset are given below:
i) compute samples c(n), n=0, 1, 2 ... M−1 using the following equation $$c(n)=e^{-j2\pi\hat{\epsilon}n/N}r(d_{opt}+n), n=0, 1 \ldots M-1$$

ii) obtain the product sequence c(n)a*(n), where a(n) are the transmitted time domain samples in one of the two identical halves of preamble 204.

ii) evaluate M point DFT of the product sequence obtained in step ii).
iii) find a DFT coefficient, $I_1$, whose magnitude is largest. Then $2I_1$ is the estimate of the integer part of the frequency-offset.

In accordance with an embodiment of the present invention, the frequency-offset estimation using preamble 204 enables frequency synchronization in packet-based OFDM. As explained above, the frequency-offset estimation can be achieved by estimating first the fractional part and then the integer part of the frequency-offset.

In accordance with an embodiment of the present invention, the threshold for detection of the preamble boundary has been determined, based on the mean and variance of the timing metric for the AWGN channel.

In accordance with an embodiment of the present invention, assume that the samples of the received signal are given by $r(n)=a((n-L) \bmod M)+\eta(n)$, for $n=0, 1, \ldots, 2M+L-1$, where $a(n)$, for $n=0, 1, \ldots, M-1$, are the time domain samples of one of the two identical halves of preamble 204, and $\eta(n)$ is a zero mean complex white Gaussian noise with variance $\sigma^2_\eta$. Without loss of generality, let d denote the sample index measured with respect to left boundary of CP 202 of preamble 204 in the received signal. Consequently, $d=0$ implies that the window of 2M received samples begins at the left boundary of CP 202. Then, for $0 \leq d \leq L$, it can be shown that the timing metric is Gaussian distributed with mean $\mu_{M(d)}$, and variance $\sigma^2_{M(d)}$, as $$\mu_{M(d)} = \frac{\left[\sum_{i=0}^{M-1} |a((d+i-L) \bmod M)|^2 |a(i)|^2\right]^2}{\left(\sum_{i=0}^{M-1} |a(i)|^2 + M\sigma^2_\eta\right)^2} \quad (9)$$

$$\sigma^2_{M(d)} = \quad (10)$$

$$\frac{4\mu_{M(d)}}{\left(\sum_{i=0}^{M-1} |a(i)|^2 + M\sigma^2_\eta\right)^2} \sum_{i=0}^{M-1} \left[|a(i)|^4 \left\{|a((d+i-L) \bmod M)|^2 \sigma^2_n + \sigma^4_n/2\right\} + \mu_{M(d)}\left\{M\sigma^4_n + 2\sigma^2_n \sum_{i=0}^{M-1} |a(i)|^2\right\} - 2\sqrt{\mu_{M(d)}} |a(i)|^2 |a((d+i-L) \bmod M)|^2 \sigma^2_n\right].$$

Figure 5:
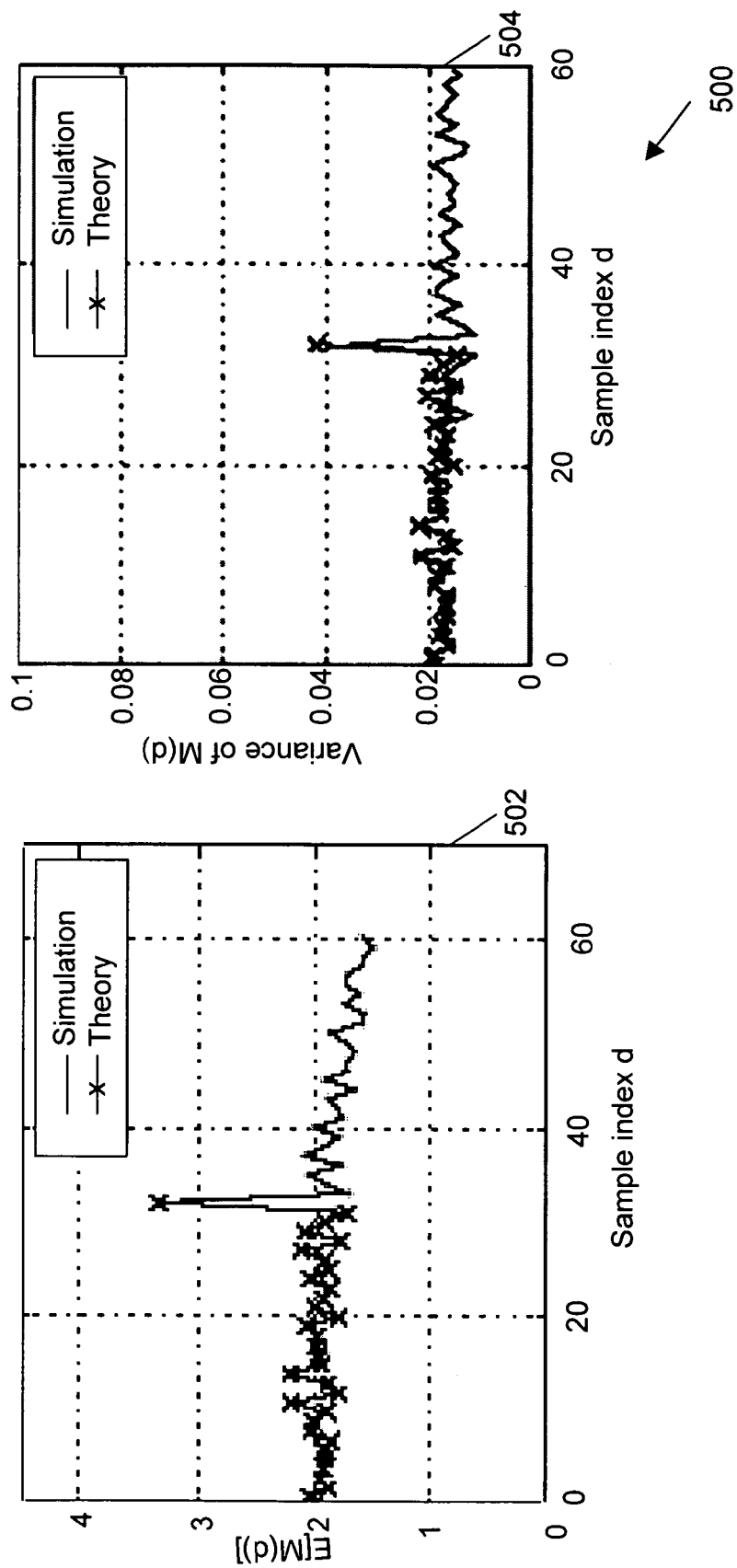
FIG. 5 illustrates simulation and theoretical results showing mean and variance of a timing metric for an Additive White Gaussian Noise (AWGN) channel, in accordance with an embodiment of the present invention.

The graphs illustrating the mean and the variance for the AWGN channel evaluated from equations (9) and (10) are shown in FIG. 5.

In order to determine the number of false-detections, miss-detections, and correct-detections in the methodology of the present invention, steps 402-412 were carried out 1000 times, choosing a different noise realization each time in the AWGN case and, choosing a different realization of noise and the channel each time in the case of frequency selective channel.

The received signal is the transmitted signal plus zero mean complex additive white Gaussian noise in the case of an AWGN channel, and the transmitted signal convolved with channel impulse response plus zero mean complex additive white Gaussian noise in the case of a frequency selective channel. The transmitted signal includes the preamble preceded by CP 202 and followed by data symbols. The preamble is generated with 200 used carriers, 56 null carriers—28 on the left and 27 on the right, and a dc carrier. The even (used) carriers are loaded with a PN sequence given in the Wireless MAN standard IEEE 802.16-2004 for OFDM mode. A frequency offset of 10.5 times the subcarrier spacing and a cyclic prefix of length 32 samples are assumed in the simulation experiments.

FIG. 5 illustrates the simulation and theoretical results showing the mean and variance of the timing metric for an Additive White Gaussian Noise (AWGN) channel, in accordance with an embodiment of the present invention. Graph 502 illustrates the mean of the timing metric and graph 504 illustrates the variance of the timing metric for the AWGN channel. Graphs 502 and 504 can be used to predict the probability of false detection and correct detection. As observed from graph 500, a peak at $d=L=32$ is the largest, and for $d<L$ there is a second-largest peak at $d=14$.

In accordance with an embodiment of the invention, a threshold is chosen as $$M_{th} = \mu_{M(14)} + 2\sigma_{M(14)} \quad (11)$$

With this threshold, the preamble boundary is estimated following the steps of the algorithm described in the flowchart of FIGS. 4A and 4B and the results are given in the following table.

If the value of $d_{opt}$ obtained at the step 412 is $L=32$, then the detection is taken as a correct detection. However, if the value of $d_{opt}$ obtained at step 412 is not $L=32$, then the detection is taken as a false detection. If the timing metric does not cross the threshold at any sample index within the range $0 \leq d \leq 32$, then the detection is taken as a miss-detection.

These results have been obtained for SNR=9.4 (Signal to Noise Ratio) decibels for the AWGN and frequency selective channels. The Stanford University Interim (SUI) channel modeling is used to simulate the frequency selective channels. An SNR of 9.4 dB is assumed in the simulations as it is the recommended SNR of the preamble in the wireless MAN standard IEEE 802.16-2004.

| Channel type | Miss detection | False detection | Correct detection |
| --- | --- | --- | --- |
| AWGN | 0 | 0 | 1000 |
| SUI-1 | 2 | 2 | 996 |
| SUI-2 | 34 | 14 | 952 |
| SUI-3 | 171 | 78 | 751 |

In the case of an SUI-3 channel, the probability of correct detection has dropped significantly, because we have not considered the cases where the $d_{opt}$ shifts due to channel dispersion. In such cases, the timing estimate should be pre-advanced by some samples, to maintain orthogonality among the sub-carriers.

Figure 6:
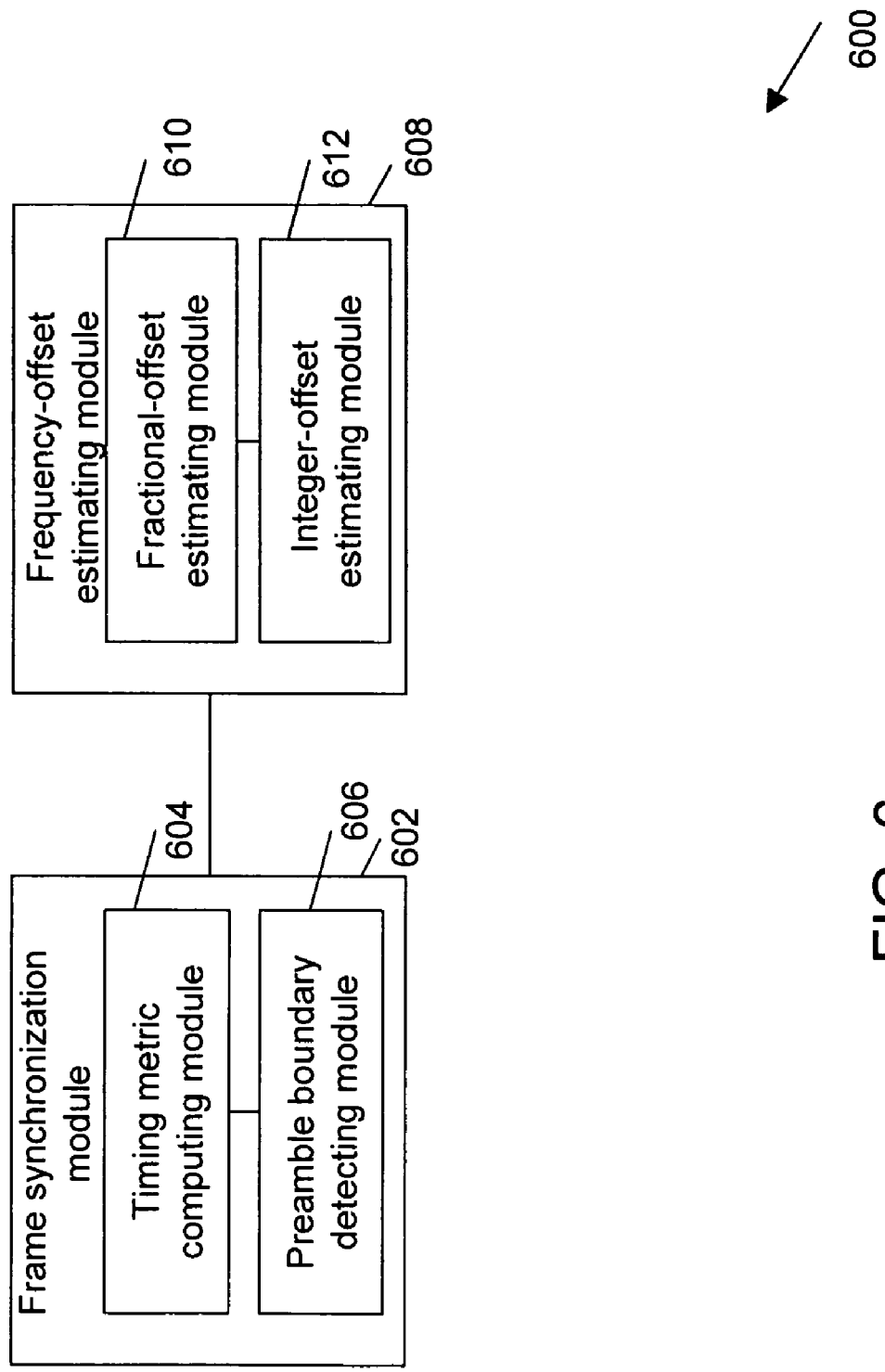
FIG. 6 is a block diagram of a system for frame and frequency synchronization in packet-based OFDM, in accordance with an embodiment of the present invention.

FIG. 6 is a block diagram of a system 600 for frame and frequency synchronization in packet-based OFDM, in accordance with an embodiment of the present invention. System 600 includes a frame synchronization module 602 and a frequency-offset estimating module 608. Frame synchronization module 602 includes a timing metric computing module 604 and a preamble boundary detecting module 606. Frequency-offset estimating module 608 includes a fractional-offset estimating module 610 and an integer-offset estimating module 612.

Timing metric computing module 604 computes the timing metric for packet-based OFDM. Preamble boundary detecting module 606 detects the preamble boundary, based on a threshold. The threshold is determined a priori, based on the mean and variance of the timing metric at the preamble boundary and in the neighborhood of the preamble boundary. The mean and the variance are evaluated for an AWGN channel. The detection of the preamble boundary enables frame synchronization in packet-based OFDM.

Subsequently, frequency-offset estimating module 608 estimates the frequency-offset for performing frequency synchronization in packet-based OFDM. This can be achieved by fractional-offset estimating module 610 and integer-offset estimating module 612. Since the frequency-offset may include a fractional part and an integer part, fractional-offset estimating module 610 estimates the fractional part of the frequency-offset using preamble 204. Similarly, integer-offset estimating module 612 estimates the integer part of the frequency-offset using preamble 204.

In accordance with an embodiment of the present invention, CP length, L can be estimated in the application to the OFDM mode of the Wireless Metropolitan Area Network (WMAN). This is explained in conjunction with FIG. 7.

Figure 7:
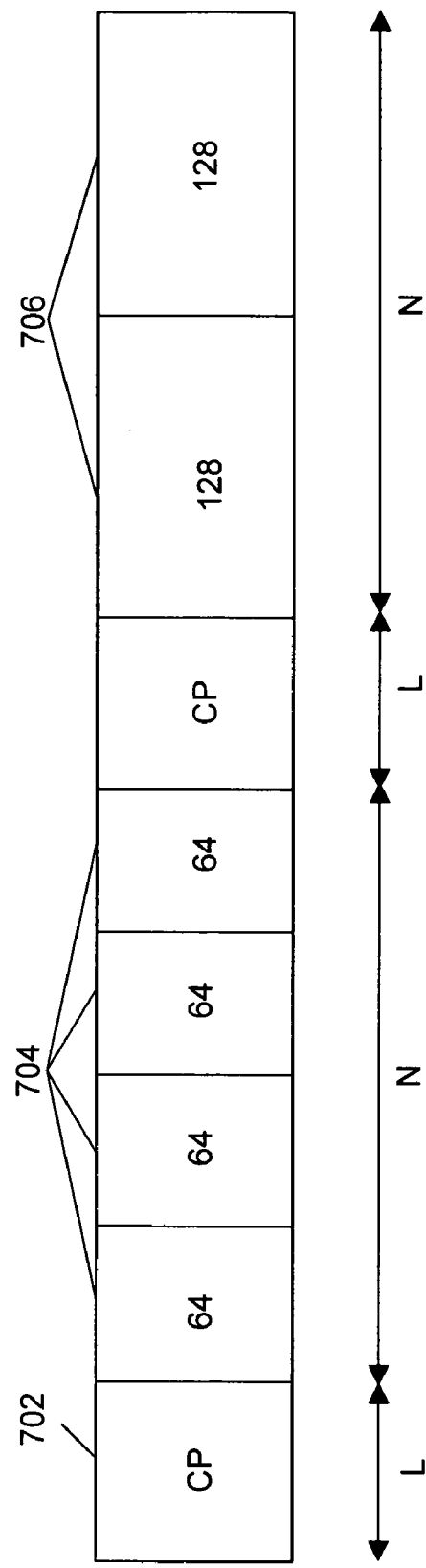
FIG. 7 illustrates a preamble structure in an OFDM mode of Wireless Metropolitan Area Network (WMAN), in accordance with an embodiment of the present invention.

FIG. 7 illustrates a preamble structure in an OFDM mode of WMAN, in accordance with an embodiment of the present invention. The WMAN-OFDM physical layer is based on OFDM modulation with 256 sub-carriers. In this mode, a preamble includes a first OFDM symbol 704 and a second OFDM symbol 706. Each of these symbols is preceded by a CP 702. The length of CP 702 is the same as that for data symbols. In first OFDM symbol 704, only the sub-carriers whose indices are multiples of 4 are loaded. As a result, the time domain waveform (IFFT output) of first OFDM symbol 704 consists of four repetitions of a 64-sample fragment.

In the second OFDM symbol 706, only even sub-carriers are loaded, which results in a time domain waveform consisting of two repetitions of a 128-sample fragment. During initialization, a subscriber station can search for all the possible values of CP 702 and find a value that is being used by a base station. The CP length L can be estimated by estimating a segment boundary and a symbol boundary.

The segment boundary can be estimated by modifying the timing metric of equation (3). The modified timing metric is expressed as:

$$M_1(d) = \frac{|P_1(d)|^2}{R_1^2(d)} \quad (12)$$

with $P_1(d)$ and $R_1(d)$ given by, $$P_1(d) = \sum_{i=0}^{N/4-1} [r(d+i)a_1(i)]^* [r(d+i+N/4)a_1(i)] \quad (13)$$

$$R_1(d) = \sum_{i=0}^{N/4-1} |r(d+i+N/4)|^2 \quad (14)$$

where d is a sample index corresponding to the first sample in a window of N/2 samples. $R_1(d)$ gives an estimate of the energy in the N/4 samples of the received signal, $a_1(n)$, for n=0, 1, ..., N/4−1, are time domain samples of one segment of first OFDM symbol of the preamble.

By applying the modified timing metric, a segment boundary is estimated, corresponding to one of the first three segments of first OFDM symbol 704. Further, by applying the timing metric given by equations (3), (4) and (5), the boundary of a second symbol is estimated. Since the CP of the second symbol is in-between these two estimates, its length can be estimated from the following equation:

$$\hat{L} = Q[(d_2 - d_1 - 1) \bmod 64] \quad (15)$$

where $d_1$ is the estimate of the left edge of one of the first three segments of the first symbol, and $d_2$ is the estimate of the left boundary of the second symbol. The function Q(x) denotes quantization of x to the nearest value among 0, 8, 16, and 32, corresponding to CP lengths of 64, 8, 16, and 32, respectively.

Various embodiments relate to frame synchronization in packet-based OFDM. This is achieved by using a timing metric that yields a sharp peak at the preamble boundary in packet-based OFDM. As a result, frame synchronization is unambiguous.

Various embodiments relate to frequency synchronization in packet-based OFDM. This is achieved by estimating fractional and integer parts of the frequency-offset. The integer part of the frequency-offset is estimated by finding Discrete Fourier Transform (DFT) of an M-length sequence. The M-length sequence is obtained by multiplying conjugate of M samples of preamble 204 in the transmitted signal with M samples of the corresponding block in the received signal. The corresponding block in the received signal is obtained after compensating with the fractional frequency offset estimate.

Various embodiments relate to frame and frequency synchronization for preamble 204 in uplink as well as downlink synchronization.

Various embodiments relate to CP length estimation in packet-based OFDM. The CP length, L, can be estimated in the application to the OFDM mode of WMAN by estimating a segment boundary and the symbol boundary of the preamble shown in FIG. 7.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention. The system is also likely to be implemented with ASIC's, PLC's and the like in portable devices.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

The present invention may also be implemented by the microprocessor according to computer-executable instructions. The computer-executable instructions being stored on a computer-readable medium.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system for frame and frequency synchronization in packet-based Orthogonal Frequency Division Multiplexing (OFDM), the system comprising:
   a. a frame synchronization module, the frame synchronization module enabling frame synchronization, the frame synchronization module comprising:
      i. a timing metric computing module, the timing metric computing module computing a timing metric, wherein the timing metric comprises a numerator, and a denominator, the numerator being lag-M auto-correlation of 2M-length sequence, M being the number of samples in each of the two identical halves of the preamble, the 2M-length sequence being obtained by multiplying a block of latest 2M samples of a received signal with 2M samples of the preamble, the denominator being an estimate of energy in the block of M samples of the received signal; and
      ii. a preamble boundary detecting module, the preamble boundary detecting module detecting the preamble boundary, the preamble boundary being detected based on a threshold, the threshold being determined a priori based on mean and variance of the timing metric at the preamble boundary and in neighborhood of the preamble boundary, the mean and the variance being estimated for an Additive White Gaussian Noise (AWGN) channel, the detection of the preamble boundary enabling frame synchronization; and
   b. a frequency-offset estimation module, the frequency-offset estimation module performing frequency-offset estimation after frame synchronization, the frequency-offset estimation enabling frequency synchronization, the frequency-offset estimation module comprising:
      i. a fractional-offset estimating module, the fractional-offset estimating module estimating a fractional part of the frequency-offset; and
      ii. an integer-offset estimating module, the integer-offset module estimating an integer part of the frequency-offset, the integer part of the frequency-offset being estimated by finding a Discrete Fourier Transform (DFT) of a M-length sequence, the M-length sequence being obtained by multiplying conjugate of M samples of the preamble in a transmitted signal with M samples of a corresponding block in a received signal, the corresponding block in the received signal being obtained after compensating with the fractional part of the frequency-offset, and by finding a DFT coefficient with largest magnitude, the DFT coefficient enabling the estimation of the integer part of the frequency-offset.

2. The system of claim 1, wherein the system is used for downlink synchronization.

3. The system of claim 1, wherein the system is used for uplink synchronization.

4. The system of claim 1 further comprising an Application Specific Integrated Circuit (ASIC) to interact with the one or modules for the frame and frequency synchronization in the packet-based Orthogonal Frequency Division Multiplexing (OFDM).

* * * * *